(12) United States Patent
Franklin et al.

(10) Patent No.: US 10,089,179 B2
(45) Date of Patent: *Oct. 2, 2018

(54) FAILURE-DECOUPLED VOLUME-LEVEL REDUNDANCY CODING TECHNIQUES

(71) Applicant: Amazon Technologies, Inc., Seattle, WA (US)

(72) Inventors: Paul David Franklin, Seattle, WA (US); Bryan James Donlan, Seattle, WA (US); Claire Elizabeth Suver, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/640,067

(22) Filed: Jun. 30, 2017

(65) Prior Publication Data
US 2017/0300384 A1    Oct. 19, 2017

Related U.S. Application Data

(63) Continuation of application No. 15/283,023, filed on Sep. 30, 2016, now Pat. No. 9,697,080, which is a continuation of application No. 14/673,796, filed on Mar. 30, 2015, now Pat. No. 9,459,959.

(51) Int. Cl.
*G06F 11/00* (2006.01)
*G06F 11/10* (2006.01)
*G06F 3/06* (2006.01)

(52) U.S. Cl.
CPC ............ *G06F 11/1076* (2013.01); *G06F 3/06* (2013.01); *G06F 11/1068* (2013.01); *G06F 11/1072* (2013.01); *G06F 11/1088* (2013.01)

(58) Field of Classification Search
CPC ............ G06F 11/1076; G06F 11/1072; G06F 11/1068; G06F 11/108; G06F 3/06; H06F 11/1088
See application file for complete search history.

(56) References Cited

U.S. PATENT DOCUMENTS

| | | |
|---|---|---|
| 6,779,150 B1 | 8/2004 | Walton et al. |
| 8,386,841 B1 | 2/2013 | Renade |
| 8,984,363 B1 | 3/2015 | Juels et al. |

(Continued)

*Primary Examiner* — Christine Tu
(74) *Attorney, Agent, or Firm* — Davis Wright Tremaine LLP

(57) ABSTRACT

Techniques described and suggested herein include systems and methods for storing, indexing, and retrieving original data of data archives on data storage systems using redundancy coding techniques. For example, redundancy codes, such as erasure codes, may be applied to archives (such as those received from a customer of a computing resource service provider) so as allow the storage of original data of the individual archives available on a minimum of volumes, such as those of a data storage system, while retaining availability, durability, and other guarantees imparted by the application of the redundancy code. Sparse indexing techniques may be implemented so as to reduce the footprint of indexes used to locate the original data, once stored. The volumes may be apportioned into failure-decorrelated subsets, and archives stored thereto may be apportioned to such subsets.

20 Claims, 10 Drawing Sheets

(56) References Cited

U.S. PATENT DOCUMENTS

| | | | | |
|---|---|---|---|---|
| 9,021,297 B1 * | 4/2015 | Hayes | ............... | G06F 11/1666 |
| | | | | 714/6.3 |
| 9,825,652 B1 * | 11/2017 | Lazier | ............... | H03M 13/2942 |
| 9,838,041 B1 * | 12/2017 | Lazier | ............... | H03M 13/2942 |
| 9,866,242 B1 * | 1/2018 | Lazier | ............... | H03M 13/2942 |
| 2015/0149870 A1 | 5/2015 | Kozat | | |

* cited by examiner

US 10,089,179 B2

FAILURE-DECOUPLED VOLUME-LEVEL REDUNDANCY CODING TECHNIQUES

CROSS REFERENCE TO RELATED APPLICATIONS

This application is a continuation of U.S. patent application Ser. No. 15/283,023, filed on Sep. 30, 2016, entitled "FAILURE-DECOUPLED VOLUME-LEVEL REDUNDANCY CODING TECHNIQUES," which is a continuation of U.S. patent application Ser. No. 14/673,796, filed on Mar. 30, 2015, entitled "FAILURE-DECOUPLED VOLUME-LEVEL REDUNDANCY CODING TECHNIQUES," the content of which is incorporated by reference herein in its entirety.

BACKGROUND

The use of network computing and storage has proliferated in recent years. The resources for network computing and storage are often provided by computing resource providers who leverage large-scale networks of computers, servers, and storage drives to enable clients, including content providers, online merchants, and the like, to host and execute a variety of applications and web services. Content providers and online merchants, who traditionally used on-site servers and storage equipment to host their websites and store and stream content to their customers, often forego on-site hosting and storage and turn to using the resources of the computing resource providers. The usage of network computing allows content providers and online merchants, among others, to efficiently and to adaptively satisfy their computing needs, whereby the computing and storage resources used by the content providers and online merchants are added or removed from a large pool provided by a computing resource provider as need and depending on their needs.

The proliferation of network computing and storage, as well as the attendant increase in the number of entities dependent on network computing and storage, has increased the importance of optimizing data performance and integrity on network computing and storage systems. Data archival systems and services, for example, may use various types of error correcting and error tolerance schemes, such as the implementation of redundancy coding and data sharding. Furthermore, capacity and cost of persisting increasing quantities of data may be mitigated by the use of data storage devices or media that is considerably faster at sequential storage than random access storage, relative to other data storage devices.

BRIEF DESCRIPTION OF THE DRAWINGS

Various embodiments in accordance with the present disclosure will be described with reference to the drawings, in which.

DETAILED DESCRIPTION

Figure 1:
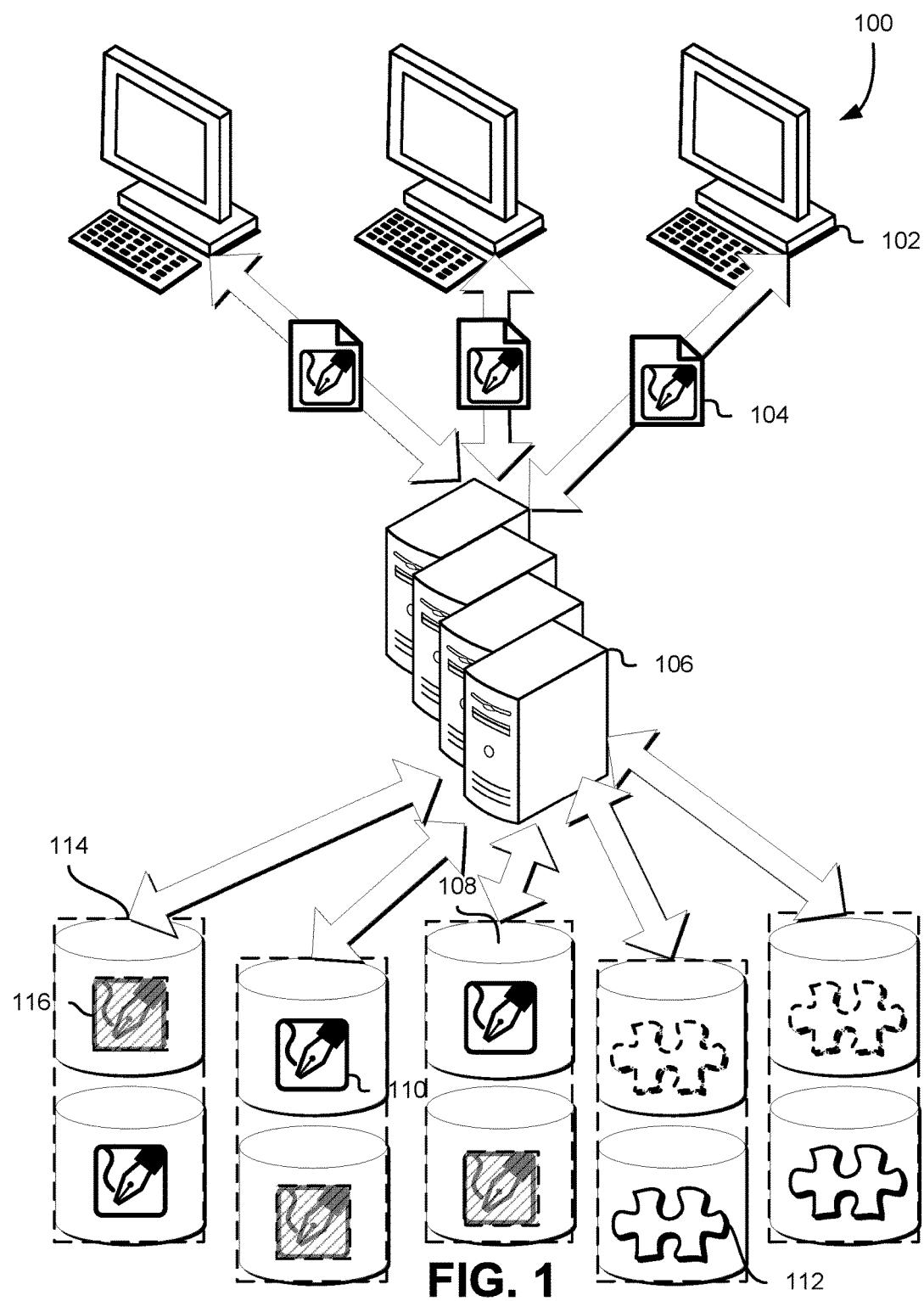
FIG. 1 schematically illustrates an environment in which original data of archives may be stored on a data storage system implementing a redundancy code, in accordance with some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for storing original data of data archives ("archives") on data storage systems using redundancy coding techniques. For example, redundancy codes, such as erasure codes, may be applied to incoming archives (such as those received from a customer of a computing resource service provider implementing the storage techniques described herein) so as to allow the storage of original data of the individual archives available on a minimum of volumes, such as those of a data storage system, while retaining availability, durability, and other guarantees imparted by the application of the redundancy code.

In some embodiments, archives, such as customer archives containing any quantity and nature of data, are received from customers of a computing resource service provider through a service, such as an archival storage service, provided by one or more resources of the computing resource service provider. The archives may be sorted according to one or more common attributes, such as the identity of the customer, the time of upload and/or receipt by, e.g., the archival storage service. Such sorting may be performed so as to minimize the number of volumes on which any given archive is stored. In some embodiments, the original data of the archives is stored as a plurality of shards across a plurality of volumes, the quantity of which (either shards or volumes, which in some cases may have a one to one relationship) may be predetermined according to various factors, including the number of total shards necessary to reconstruct the original data using a redundancy code.

In some embodiments, the volumes may be grouped into volume sets, and in some of such embodiments, the volume sets may be apportioned into failure-decorrelated subsets of volumes (or "cohorts"). A given volume set may include, depending on the redundancy coding scheme used, volumes that store original data of incoming archives, as well as volumes that store derived data (e.g., with mathematical transformations applied according to the implementing redundancy coding scheme). The volume set may include more volumes than is necessitated by the implemented redundancy coding scheme. In such embodiments, a quantity of failure-decorrelated subsets of the volume set is determined such that the number of volumes in each failure-decorrelated subset corresponds to the number of volumes necessitated by the implemented redundancy coding scheme. In some embodiments, the failure-decorrelated subsets are implemented such that incoming archives to be stored in a given volume set are committed to different failure-decorrelated subsets, according to some apportionment scheme (e.g., based on an attribute of the incoming data itself, in a predetermined sequence, etc.).

In some embodiments, one or more indices may be generated in connection with, e.g., the order in which the archives are to be stored, as determined in connection with the sorting mentioned immediately above. An index may, in some embodiments, be generated for each volume of the plurality, and in such embodiments, may reflect the archives stored on the respective volume to which it applies. The indices may be of any appropriate type, and may include sparse indices. In embodiments where sparse indices are used, the index (e.g., for a given volume) may point to a subset of archives stored or to be stored on, e.g., that volume. The subset may be selected on any basis and for any appropriate interval. Examples may include the identification of the archives located at an interval of x blocks or bytes of the volume, or the identification of the archives at an interval of n archives, where x or n may be predetermined by, e.g., the archival storage service or an administrator thereof.

In some embodiments, the sparse indexes are used in connection with information relating to the sort order of the archives so as to locate archives without necessitating the use of dense indexes, e.g., those that account for every archive on a given volume. Such sort order-related information may reside on the volume(s) or, in some embodiments, on an entity separate from the volume(s). Similarly, the indexes may be stored on the same volume(s) to which they apply, or, in some embodiments, separately from such volume(s). In embodiments where the sort order-related information and/or the indexes are stored on the applicable volumes, they may be included with the original data of the archives and stored therewith as shards, as previously mentioned.

In some embodiments, the original data of the archives (and, in embodiments where the indices are stored on the volumes, the indices) is processed by an entity associated with, e.g., the archival storage service, using a redundancy code, such as an erasure code, so as to generate redundancy coded shards that may be used to regenerate the original data and, if applicable, the indices. In some embodiments, the redundancy code may utilize a matrix of mathematical functions (a "generator matrix"), a portion of which may include an identity matrix. In some of such embodiments, the redundancy coded shards may correspond, at least in part, to the portion of the generator matrix that is outside of the identity matrix. Redundancy coded shards so generated may be stored in further volumes. The total number of volumes may include the volumes bearing the original data (and indices) as well as the volumes containing the redundancy coded shards.

In some embodiments, retrieval of an archive stored in accordance with the techniques described herein may be requested by an entity, such as a client device under control of a customer of the computing resource service provider and/or the archival storage service provided therefrom, as described in further detail throughout this disclosure. In response to the request, the data storage system (e.g., the system including the aforementioned volumes, and providing the archival storage service) may locate, based on information regarding the sort order of the archives as stored on the volumes, the specific volume on which the archive is located. Thereafter, the index or indices may be used to locate the specific volume, whereupon it is read from the volume and provided to the requesting entity. In embodiments where sparse indexes are employed, the sort order information may be used to locate the nearest location (or archive) that is sequentially prior to the requested archive, whereupon the volume is sequentially read from that location or archive until the requested archive is found.

In some embodiments, if one of the volumes or a shard stored thereon is detected as corrupt, missing, or otherwise unavailable, a new shard may be generated using the redundancy code applied to generate the shard(s) in the first instance. In some embodiments, the new shard may be a replication of the unavailable shard, such as may be the case if the shard includes original data of the archive(s). In some embodiments, the new shard may be selected from a set of potential shards as generated by, e.g., a generator matrix associated with the redundancy code, so as to differ in content from the unavailable shard (such as may be the case if the unavailable shard was a shard generated from the redundancy code, and therefore contains no original data of the archives). In such cases, in certain embodiments, an entirely new volume may be generated, rather than a shard.

As used herein, and as described in further detail throughout this disclosure, the volumes may be any container, whether logical or physical, capable of storing or addressing data stored therein. Such data may include archives, or derivatives thereof (e.g., shards). Volumes may be associated with one or more other volumes as cohorts, which may, for example, be arranged and/or implemented in a failure-decoupled manner as described in more detail herein. An archive may be any data object or collection of data objects to be processed using the techniques described herein. For example, archives may be received by a customer of a system implementing the described techniques, for processing and storage therewith. Shards may be any quantity of data, such as a portion of a data object; for example, a plurality of shards may be generated as a result of encoding a data object using a redundancy code. A generator matrix may be a matrix of functions used by some of such redundancy codes, and used to encode a given data object (or portion thereof) into their encoded form (which, as may be contemplated, may be in the form of the aforementioned shards).

FIG. 1 schematically illustrates an environment 100 in which original data of archives may be stored on a data storage system implementing a redundancy code, in accordance with some embodiments. One or more client entities 102, such as those under control of a customer of a computing resource service provider, submit archive(s) 104 to a data storage system 106 for storage. The client entities 102 may be any entity capable of transacting data with a data storage system, such as over a network (including the Internet). Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), services (e.g., such as those connecting to the data storage system 106 via application programming interface calls, web service calls, or other programmatic methods), and the like.

The data storage system 106 may be any computing resource or collection of such resources capable of processing data for storage, and interfacing with one or more resources to cause the storage of the processed data. Examples include physical computing systems (e.g., servers, desktop computers, laptop computers, thin clients, and handheld devices, such as smartphones and tablets), virtual computing systems (e.g., as may be provided by the computing resource service provider using one or more resources associated therewith), services (e.g., such as those connecting to the data storage system 106 via application programming interface calls, web service calls, or other programmatic methods), and the like. In some embodiments, the resources of the data storage system 106, as well as the data storage system 106 itself, may be one or more resources of a computing resource service provider, such as that described in further detail below. In some embodiments, the data storage system 106 and/or the computing resource service provider provides one or more archival storage services and/or data storage services, such as those described in further below, through which the client entities 102 may transact data such as the archives 104.

The archives 104 may include any quantity of data in any format. For example, the archives 104 may be single files, or, in some embodiments, may include several files. The archives 104 may be encrypted by, e.g., the client device(s) 102, or, in some embodiments, may be encrypted by a component of the data storage system 106 after receipt of the archives 104, such as on the request of a customer of the data storage system 106 and/or the computing resource service provider.

The data storage system 106 may sort the archives 104 according to one or more criteria (and in the case where a plurality of criteria is used for the sort, such criteria may be sorted against sequentially and in any order appropriate for the implementation). Such criteria may be attributes common to some or all of the archives, and may include the identity of the customer, the time of upload (e.g., by the client device 102) and/or receipt (by the data storage system 106), archive size, expected volume and/or shard boundaries relative to the boundaries of the archives (e.g., so as to minimize the number of archives breaking across shards and/or volumes), and the like. As mentioned, such sorting may be performed so as to minimize the number of volumes on which any given archive is stored. Such techniques may be used, e.g., to optimize storage in embodiments where the overhead of retrieving data from multiple volumes is greater than the benefit of parallelizing the retrieval from the multiple volumes. Information regarding the sort order may be persisted, e.g., by the data storage system 106, for use in techniques described in further detail herein.

As previously discussed, in some embodiments, one or more indices may be generated in connection with, e.g., the order in which the archives are to be stored, as determined in connection with the sorting mentioned immediately above. The index may be a single index or may be a multipart index, and may be of any appropriate architecture and may be generated according to any appropriate method. For example, the index may be a bitmap index, dense index, sparse index, or a reverse index. Embodiments where multiple indices are used may implement different types of indices according to the properties of, e.g., the archives 104 to be stored via the data storage system 106. For example, a data storage system 106 may generate a dense index for archives over a specified size (as the size of the index itself may be small relative to the number of archives stored on a given volume), and may also generate a sparse index for archives under that specified size (as the ratio of index size to archive size increases).

The data storage system 106 is connected to or includes one or more volumes 108 on which the archives 104, and in some embodiments, the generated indices, are stored. The volumes 108 may be any container, whether logical or physical, capable of storing or addressing data stored therein. In some embodiments, the volumes 108 may map on a one-to-one basis with the data storage devices on which they reside (and, in some embodiments, may actually be the data storage devices themselves). In some embodiments, the size and/or quantity of the volumes 108 may be independent of the capacity of the data storage devices on which they reside (e.g., a set of volumes may each be of a fixed size such that a second set of volumes may reside on the same data storage devices as the first set). The data storage devices may include any resource or collection of resources, such as those of a computing resource service provider, that are capable of storing data, and may be physical, virtual, or some combination of the two.

As previously described, one or more indices may, in some embodiments, be generated for each volume 108 of the plurality, and in such embodiments, may reflect the archives stored on the respective volume 108 to which it applies. In embodiments where sparse indices are used, a sparse index for a given volume may point to a subset of archives 104 stored or to be stored on that volume 108, such as those archives 104 which may be determined to be stored on the volume 108 based on the sort techniques mentioned previously. The subset of volumes to be indexed in the sparse index may be selected on any appropriate basis and for any appropriate interval. For example, the sparse index may identify the archives to be located at every x blocks or bytes of the volume (e.g., independently of the boundaries and/or quantity of the archives themselves). As another example, the sparse index may identify every nth archive to be stored on the volume 108. As may be contemplated, the indices (whether sparse or otherwise), may be determined prior to actually storing the archives on the respective volumes. In some embodiments, a space may be reserved on the volumes so as to generate and/or write the appropriate indices after the archives 104 have been written to the volumes 108.

In some embodiments, the sparse indexes are used in connection with information relating to the sort order of the archives so as to locate archives without necessitating the use of dense indexes, e.g., those that account for every archive 104 on a given volume 108. Such sort order-related information may reside on the volume(s) 108 or, in some embodiments, on an entity separate from the volume(s) 108, such as in a data store or other resource of a computing resource service provider. Similarly, the indexes may be stored on the same volume(s) 108 to which they apply, or, in some embodiments, separately from such volume(s) 108.

As mentioned, the archives 104 are stored, bit for bit (e.g., the "original data" of the archives), on a subset of the plurality of volumes 108. Also as mentioned, appropriate indices may also be stored on the applicable subset of the plurality of volumes 108. The original data of the archives is stored as a plurality of shards across a plurality of volumes, the quantity of which (either shards or volumes, which in some cases may have a one to one relationship)

may be predetermined according to various factors, including the number of total shards necessary to reconstruct the original data using a redundancy code. In some embodiments, the number of volumes used to store the original data of the archives is the quantity of shards necessary to reconstruct the original data from a plurality of shards generated by a redundancy code from the original data. As an example, FIG. 1 illustrates five volumes, three of which contain original data 110 and two of which contain derived data 112, such as redundancy coded data. In the illustrated example, the redundancy code used may require any three shards to regenerate original data, and therefore, a quantity of three volumes may be used to write the original data (even prior to any application of the redundancy code).

The volumes 108 bearing the original data 110 may each contain or be considered as shards unto themselves. In embodiments where the sort order-related information and/or the indexes are stored on the applicable volumes 108, they may be included with the original data of the archives and stored therewith as shards, as previously mentioned. In the illustrated example, the original data 110 is stored as three shards (which may include the respective indices) on three associated volumes 108. In some embodiments, the original data 110 (and, in embodiments where the indices are stored on the volumes, the indices) is processed by an entity associated with, e.g., the archival storage service, using a redundancy code, such as an erasure code, so as to generate the remaining shards, which contain encoded information rather than the original data of the archives. The original data 110 may be processed using the redundancy code at any time after being sorted, such as prior to being stored on the volumes, contemporaneously with such storage, or after such storage.

Such encoded information may be any mathematically computed information derived from the original data, and depends on the specific redundancy code applied. As mentioned, the redundancy code may include erasure codes (such as online codes, Luby transform codes, raptor codes, parity codes, Reed-Solomon codes, Cauchy codes, Erasure Resilient Systematic Codes, regenerating codes, or maximum distance separable codes) or other forward error correction codes. In some embodiments, the redundancy code may implement a generator matrix that implements mathematical functions to generate multiple encoded objects correlated with the original data to which the redundancy code is applied. In some of such embodiments, an identity matrix is used, wherein no mathematical functions are applied and the original data (and, if applicable, the indexes) are allowed to pass straight through. In such embodiments, it may be therefore contemplated that the volumes bearing the original data (and the indexes) may correspond to objects encoded from that original data by the identity matrix rows of the generator matrix of the applied redundancy code, while volumes bearing derived data correspond to other rows of the generator matrix. In the example illustrated in FIG. 1, the five volumes 108 include three volumes that have shards corresponding to the original data of the archives 110, while two have shards corresponding to the derived data 112. In this example, the applied redundancy code may result in the data being stored in a 3:5 scheme, wherein any three shards of the five stored shards are required to regenerate the original data, regardless of whether the selected three shards contain the original data or the derived data.

In some embodiments, if one of the volumes 108 or a shard stored thereon is detected as corrupt, missing, or otherwise unavailable, a new shard may be generated using the redundancy code applied to generate the shard(s) in the first instance. The new shard may be stored on the same volume or a different volume, depending, for example, on whether the shard is unavailable for a reason other than the failure of the volume. The new shard may be generated by, e.g., the data storage system 106, by using a quantity of the remaining shards necessary to regenerate the original data (and the index, if applicable) stored across all volumes, regenerating that original data, and either replacing the portion of the original data corresponding to that which was unavailable (in the case that the unavailable shard contains original data), or reapplying the redundancy code so as to provide derived data for the new shard.

As previously discussed, in some embodiments, the new shard may be a replication of the unavailable shard, such as may be the case if the unavailable shard includes original data of the archive(s). In some embodiments, the new shard may be selected from a set of potential shards as generated by, e.g., a generator matrix associated with the redundancy code, so as to differ in content from the unavailable shard (such as may be the case if the unavailable shard was a shard generated from the redundancy code, and therefore contains no original data of the archives).

In some embodiments, retrieval of an archive stored in accordance with the techniques described herein may be requested by an entity, such as a client entity 102 under control of a customer of the computing resource service provider and/or the archival storage service provided therefrom, as described in further detail throughout this disclosure. In response to the request, the data storage system 106 may locate, based on information regarding the sort order of the archives 104 as stored on the volumes 108, the specific volume 108 on which the archive 104 is located. Thereafter, the index or indices may be used to locate the specific archive, whereupon it is read from the volume and provided to the requesting client entity 102. In embodiments where sparse indexes are employed, the sort order information may be used to locate the nearest location (or archive) that is sequentially prior to the requested archive, whereupon the volume is sequentially read from that location or archive until the requested archive is found. In embodiments where multiple types of indices are employed, the data storage system 106 may initially determine which of the indices includes the most efficient location information for the request archive based on assessing the criteria used to deploy the multiple types of indices in the first instance. For example, if archives under a specific size are indexed in a sparse index and archives equal to or over that size are indexed in a parallel dense index, the data storage system 106 may first determine the size of the requested archive, and if the requested archive is larger than or equal to the aforementioned size boundary, the dense index may be used so as to more quickly obtain the precise location of the requested archive.

In some embodiments, the volumes 108 may be grouped such that each given volume 108 has one or more cohorts 114. In such embodiments, a volume set (e.g., all of the illustrated volumes 108) may be implemented that incoming archives to be stored on the volumes are apportioned to one or more failure-decorrelated subsets of the volume set. The failure-decorrelated subsets may be some combination of the volumes 108 of the volume subset, where the quantity of volumes correlates to a number of shards required for the implemented redundancy code. In the illustrated example, the overall volume set may comprise two failure-decorrelated subsets (volumes in a horizontal row) where a given constituent volume 108 is paired with a cohort (e.g., 114). In some embodiments, the incoming archives are apportioned to one or more of the cohorts in the failure-decorrelated subset according to, for example, a predetermined sequence, based on one or more attributes of the incoming archives, and the like.

The illustrated example shows, for clarity, a pair-wise cohort scheme, though other schemes are contemplated as within scope of this disclosure, some of which are outlined in greater detail herein. In the illustrated example, some of the volumes of the volume set store original data of incoming archives (e.g., 110, 116), while others store derived data (e.g., 112). The system (e.g., 106), may implement a number of failure-decorrelated subsets to which to store the incoming archives, and in the pair-wise scheme pictured, the volumes used for a given archive may differ based on some arbitrary or predetermined pattern. As illustrated, some archives may be apportioned to volumes of a given cohort that are assigned to one pattern, or failure-decorrelated subset (e.g., as shown by shaded archives and derived data 116), while others are apportioned to volumes in a different pattern (e.g., solid archives and derived data 110). The patterns, as mentioned, may be arbitrary, predefined, and/or in some cases, sensitive to attributes of the incoming data. In some embodiments, patterns may not be used at all, and the member volumes of a given failure-decorrelated subset may be selected randomly from a pool of volumes in the volume set.

Figure 2:
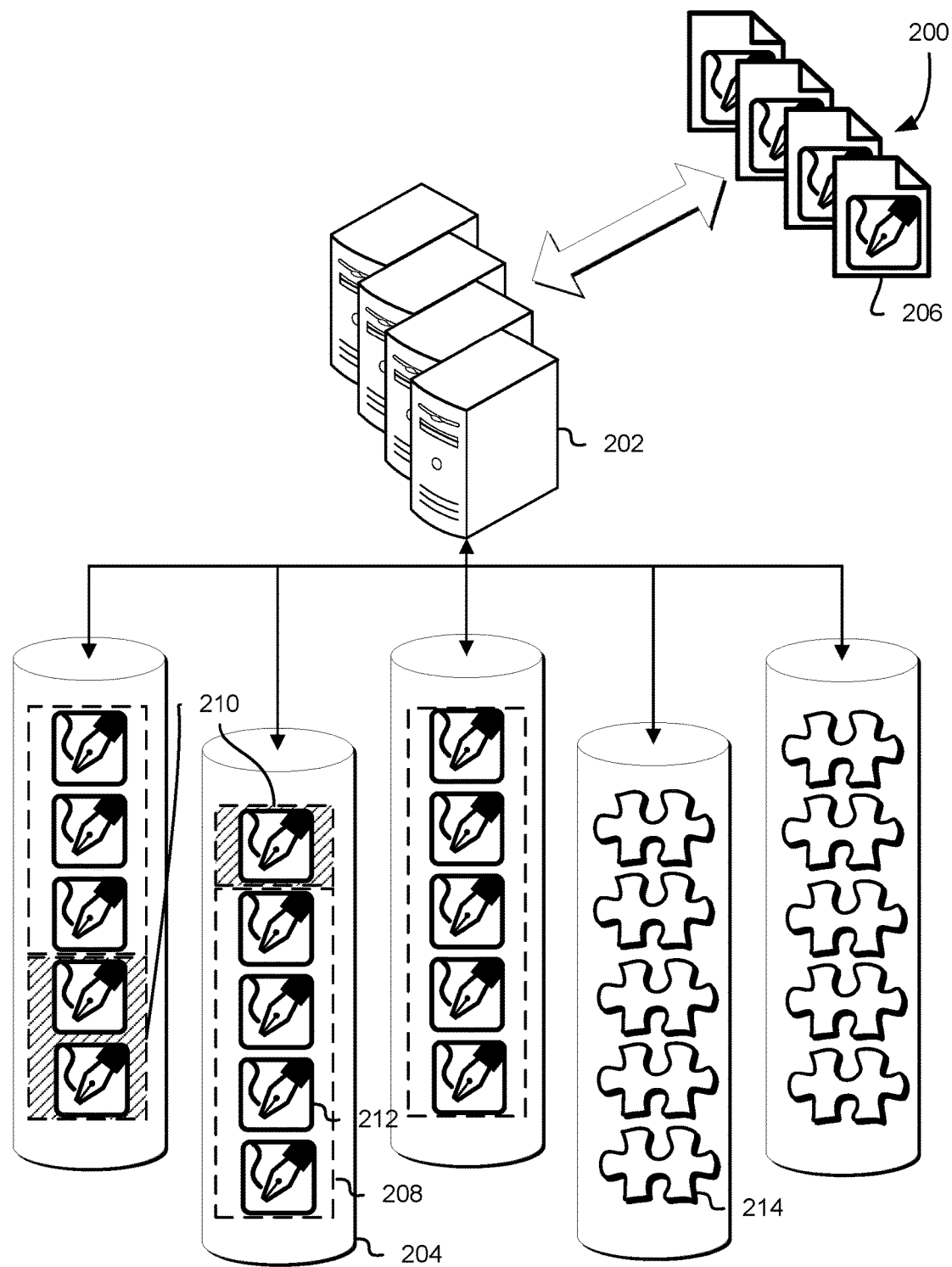
FIG. 2 schematically illustrates various workflows for storing original data of archives on a plurality of data stores of a data storage system, in accordance with some embodiments.

FIG. 2 schematically illustrates various workflows 200 for storing original data of archives on a plurality of data stores of a data storage system, in accordance with some embodiments. A data storage system 202, which in some embodiments may be similar to the data storage system 106 described above in connection with FIG. 1, includes or is connected to a plurality of volumes 204, which may be similar to the volumes 108, also described above in connection with FIG. 1. Archives 206, such as those received from client entities 102 described in connection with FIG. 1, are processed by the data storage system 202 according to the techniques described in further detail herein.

As previously discussed, the data storage system 202 may sort the archives 206 according to one or more criteria (and in the case where a plurality of criteria is used for the sort, such criteria may be sorted against sequentially and in any order appropriate for the implementation). Such criteria may be attributes common to some or all of the archives, and may include the identity of the customer, abstractions defined by the customer (e.g., larger data objects associated with multiple archives of the same customer), the time of upload and/or receipt, archive size, expected volume and/or shard boundaries relative to the boundaries of the archives (e.g., so as to minimize the number of archives breaking across shards and/or volumes), unique identifiers of the archives themselves, and the like. As previously mentioned, such sorting may be performed so as to minimize the number of volumes on which any given archive is stored. For example, larger archives may be sorted based on expected volume size, such that larger archives are stored earlier in the volume and increasingly smaller archives are stored later in the volume. Such techniques may be used, e.g., to optimize storage in embodiments where the overhead of retrieving data from multiple volumes is greater than the benefit of parallelizing the retrieval from the multiple volumes. For example, devices using removable media may incur significant latency penalties when the media are physically changed, and the sort order may concatenate and apportion archives so as to minimize the number of removable media necessary for the retrieval of the archives. As previously mentioned, information regarding the sort order may be persisted, e.g., by the data storage system 202, for use in techniques described in further detail herein.

In some embodiments, the data storage system 202 may sort the archives 206 two or more times, at least one of which may correspond to the various characteristics of the data storage system 202 and/or the volume 204 itself. For example, a first sort may include one or more of the criteria delineated above, and a second sort may, incident to actual storage of the archives 206 on one or more volumes 204, re-sort the sorted archives according to boundaries, storage space, and other volume characteristics, so as to optimize the storage of the archives 206.

As previously described (e.g., in connection with FIG. 1), one or more indices, of one or more types may, in some embodiments, be generated for each volume 204 of the plurality, and in such embodiments, may reflect the archives stored on the respective volume 204 to which it applies. In some embodiments, the indexes are used in connection with information relating to the sort order of the archives 206 so as to locate archives without necessitating the use of dense indexes, e.g., those that account for every archive 104 on a given volume 108. Such sort order-related information may reside on the volume(s) 204 or, in some embodiments, on an entity separate from the volume(s) 204, such as in a data store or other resource of a computing resource service provider. Similarly, the indexes may be stored on the same volume(s) 204 to which they apply, or, in some embodiments, separately from such volume(s) 204.

As mentioned, the original data 212 of archives 206 are stored on a subset of the plurality of volumes 204, and the quantity of the subset of volumes may be equal to the minimum number of shards required by the redundancy code to regenerate the original data. Also as mentioned, appropriate indices may also be stored on the applicable subset of the plurality of volumes 208, in connection with the original data 212 of the stored archives 208. The original data of the archives is stored as a plurality of shards across a plurality of volumes, the quantity of which (either shards or volumes, which in some cases may have a one to one relationship) may be predetermined according to various factors, including the number of total shards necessary to reconstruct the original data using a redundancy code. As an example, FIG. 2 illustrates five volumes, three of which contain original data 212 of stored archives 208 (corresponding to the incoming archives 206), and two of which contain data 214 derived from mathematical functions of the applied redundancy code. In the illustrated example, the redundancy code used may require any three shards to regenerate original data, and therefore, a quantity of three volumes may be used to write the original data (prior to any application of the redundancy code).

Similarly to previously discussed, the volumes 204 storing the original data 212 of the stored archives 208 are processed, at a volume level, by an entity associated with, e.g., the archival storage service, using a redundancy code, such as an erasure code, so as to generate the remaining shards 214, which contain encoded information rather than the original data of the archives. As previously mentioned, the original data 212 may be processed using the redundancy code at any time after being sorted, such as prior to being stored on the volumes, contemporaneously with such storage, or after such storage. As illustrated by the shaded archive 210, a given archive may, in certain cases, break between two (or possibly more) volumes 204, due to size, placement, and the like. In embodiments where the redundancy code is applied at a volume level (e.g., the entirety of the contents of the volumes bearing the original data of the archives being considered as a single data object to be processed by the redundancy code), failure of one of the two volumes (or shards) on which the original data of the illustrated archive 210 resides may not necessitate rebuilding of both volumes, but only the volume that is unavailable.

The encoded information 214 may be any mathematically computed information derived from the original data 212, and depends on the specific redundancy code applied. In some embodiments, the redundancy code may implement a generator matrix that implements mathematical functions to generate multiple encoded objects correlated with the original data to which the redundancy code is applied. In some of such embodiments, an identity matrix is used, wherein no mathematical functions are applied and the original data (and, if applicable, the indexes) are allowed to pass straight through. It may be therefore contemplated that the volumes bearing the original data (and the indexes) 208 may correspond to objects encoded from that original data by the identity matrix rows of the generator matrix of the applied redundancy code, while volumes bearing derived data 214 correspond to other rows of the generator matrix.

Similarly to previously discussed, if one of the volumes 204 or a shard stored thereon is detected as corrupt, missing, or otherwise unavailable, a new shard may be generated using the redundancy code applied to generate the shard(s) in the first instance. The new shard may be stored on the same volume or a different volume, depending, for example, on whether the shard is unavailable for a reason other than the failure of the volume. The new shard may be generated by, e.g., the data storage system 202, by using a quantity of the remaining shards necessary to regenerate the original data (and the index, if applicable) stored across all volumes, regenerating that original data, and either replacing the portion of the original data corresponding to that which was unavailable (in the case that the unavailable shard contains original data), or reapplying the redundancy code so as to provide derived data for the new shard.

As previously discussed, in some embodiments, the new shard may be a replication of the unavailable shard, such as may be the case if the unavailable shard includes original data of the archive(s). In some embodiments, the new shard may be selected from a set of potential shards as generated by, e.g., a generator matrix associated with the redundancy code, so as to differ in content from the unavailable shard (such as may be the case if the unavailable shard was a shard generated from the redundancy code, and therefore contains no original data of the archives).

Figure 3:
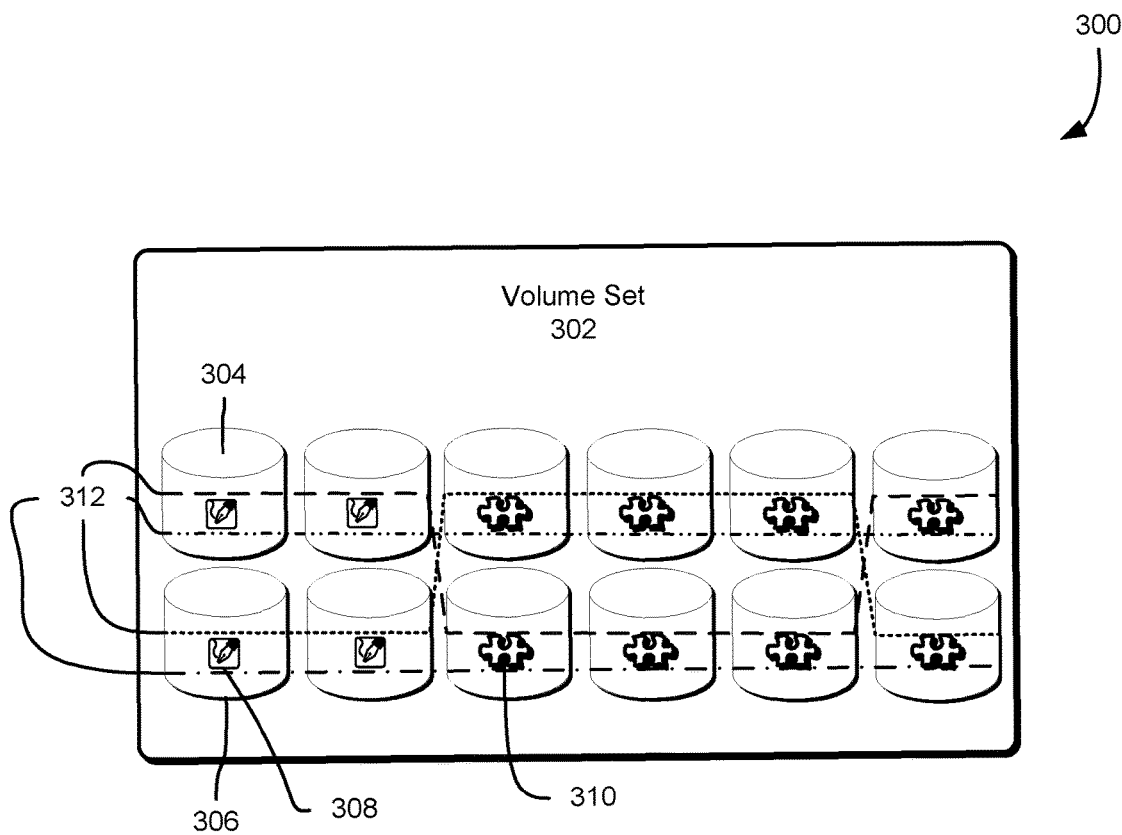
FIG. 3 schematically illustrates various workflows for storing data in failure-decorrelated subsets of a volume set, in accordance with some embodiments.

FIG. 3 schematically illustrates various workflows 300 for storing data in failure-decorrelated subsets of a volume set, in accordance with some embodiments. A volume set 302 includes a plurality of volumes 304, which may in some instances be similar in implementation and characteristics to the volumes (e.g. 108) described in at least FIGS. 1 and 2 above. As pictured, the volumes 304 may be grouped such that each given volume 304 has one or more cohorts 306. In such embodiments, the volume set 302 may be implemented that incoming archives to be stored on the volumes are apportioned to one or more failure-decorrelated subsets 312 of the volume set (depicted illustratively by four generally horizontal traces). The failure-decorrelated subsets may be some combination of the volumes 304, 306 of the volume subset 302, where the quantity of volumes in each failure-decorrelated subset 312 correlates to a number of shards required for the implemented redundancy code.

As depicted, some of the volumes of the volume set 302 are designated as storing original data 308 of archives to be stored, and others are designated as storing derived data 310, such as may be the case when a redundancy code and volume-level encoding techniques such as described elsewhere herein are implemented. However, other storage mechanisms and schemes are contemplated hereby, including object-level encoding techniques. As previously mentioned, and in the illustrated example, the overall volume set 302 may comprise multiple failure-decorrelated subsets (volumes along one of the four horizontal traces depicted) where a given constituent volume 304 is paired with one or more cohort (e.g., 306). In some embodiments, the incoming archives are apportioned to one or more of the cohorts participating in one or more of the failure-decorrelated subsets 312 according to, for example, a predetermined sequence, based on one or more attributes of the incoming archives, and the like.

The illustrated example shows, for clarity, a pair-wise cohort scheme, though other schemes are contemplated as within scope of this disclosure, some of which are outlined in greater detail herein. As mentioned, in the illustrated example, some of the volumes 304, 306, 308 of the volume set 302 store original data of incoming archives (e.g., 306), while others store derived data (e.g., 310). The system may implement a number of failure-decorrelated subsets 312 to which to store the incoming archives, and in the pair-wise scheme pictured, the volumes used for a given archive may differ based on some arbitrary or predetermined pattern (such as those depicted by the horizontal traces 312). As illustrated, some archives may be apportioned to volumes of a given cohort that are assigned to one pattern or failure-decorrelated subset 312, while others are apportioned to volumes in a different pattern 312. The size of a given failure-decorrelated subset 312 may be adjusted, in some embodiments, to account for the characteristics of the expected incoming archives, the volumes themselves, or a combination. For example, the failure-decorrelated subsets 312 may be configured to have an arbitrary byte-size boundary (e.g., may contain X bytes), an object quantity boundary (e.g., may include X objects), or be a value derived from the quantity of failure-decorrelated subsets 312 desired.

The patterns, as mentioned, may be arbitrary, predefined, and/or in some cases, sensitive to attributes of the incoming data. For example, in the planar representation shown, the patterns 312 may be selected such that each of the volumes selected for the patterns are evenly allocated and/or accessed, with few or none of the members of each given cohort (e.g., vertical pair) over- or underrepresented in a given pattern. The patterns 312 may be predefined, e.g., independently of the attributes of the incoming data and selected to optimize some operational parameter, e.g., mean time between failure or annualized failure rate of each volume or device thereon, performance of each volume and/or device thereon, minimization of slack space, power-on time, and the like, and each pattern may be used and reused in some sequence and/or at some interval. For example, each N number of archives are stored to a given failure-decorrelated subset 312 before the following N archives are stored to the next failure-decorrelated subset in the sequence, and so on.

In other examples, attributes of the incoming archives may be used to apportion archives having those attributes to a given failure-decorrelated subset 312. For example, an identity value (or hash thereof), either unique to the incoming archive or a customer thereof, may be mapped such that a given range of values within the possible extent of values is mapped to a given sequence. In some embodiments, as a result, a customer may be able to have partial or full control over the specific failure-decorrelated subset to which their archives are stored.

In some embodiments, patterns may not be used at all, and the member volumes of a given failure-decorrelated subset may be selected randomly from a pool of volumes in the volume set. For example, the patterns 312 may be constructed out of random or pseudorandom combinations of eligible volumes (e.g., with the correct number of volumes capable of storing original data 304 and the correct number of volumes capable of storing derived data 310, according to the specific redundancy coding used.

Figure 4:
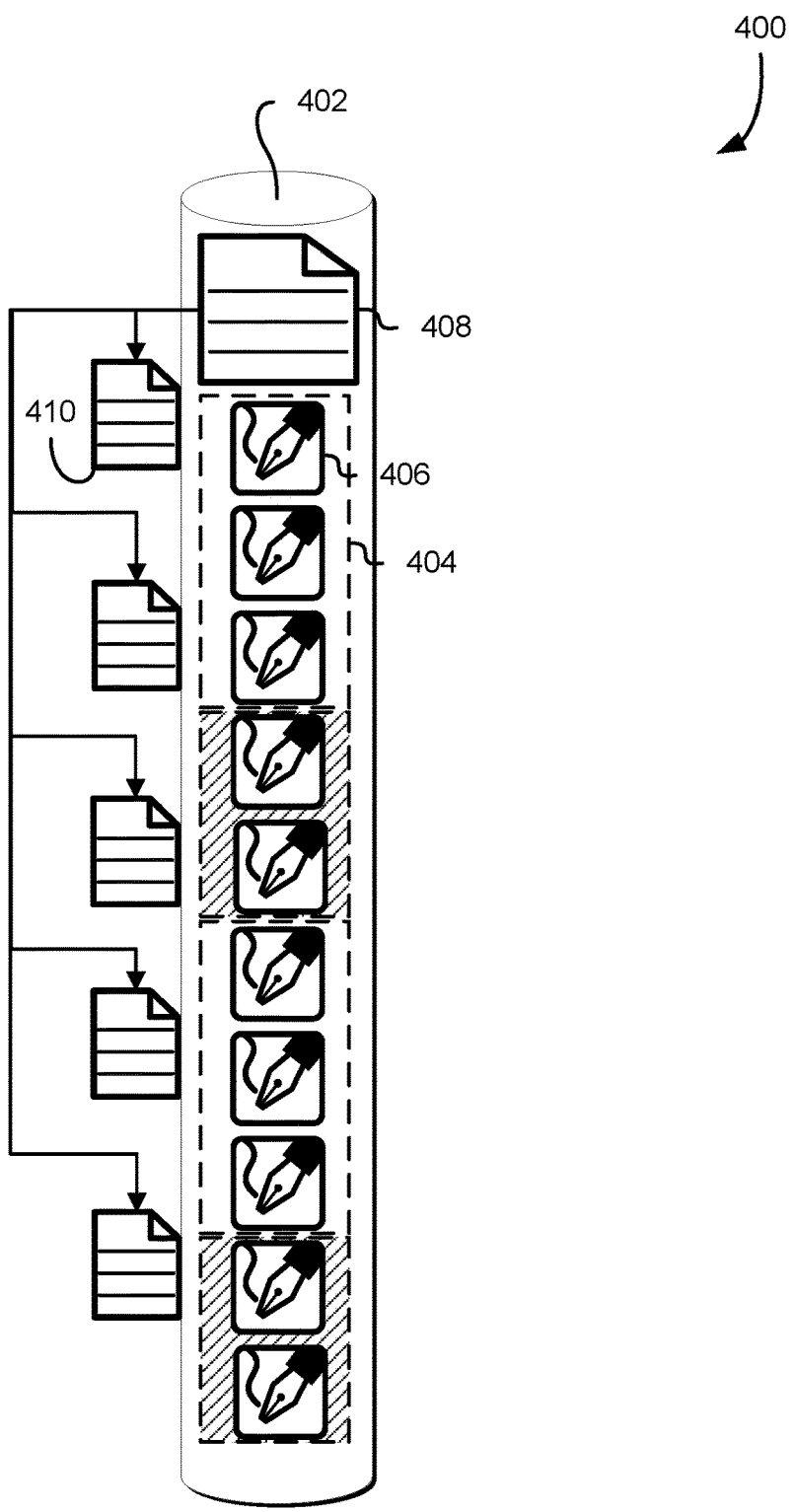
FIG. 4 schematically illustrates various workflows for indexing and locating data stored on a data storage system in accordance with some embodiments.

FIG. 4 schematically illustrates various workflows 400 for indexing and locating data stored on a data storage system in accordance with some embodiments. A representative volume 402, which in some embodiments is similar to the volumes described above in connection with FIGS. 1 and 2, stores a plurality of archives 404, including the original data 406 as, e.g., received from a customer, such as that of a data storage system or other resource and/or service of a computing resource service provider to which the data storage system is attached. The archives 404 may have been sorted in connection with one of the techniques described above in connection with FIGS. 1 and 2, and information regarding the sort order may be persisted by, e.g., a resource directly or indirectly connected with the volume 402. The volume 402 may reside on (or consist of) one or more storage devices that are optimized for sequential data access, relative to random data access.

As previously discussed, in some embodiments, one or more indices 408 may be generated in connection with, e.g., the order in which the archives are to be stored, as determined in connection with the sorting mentioned previously. The index may be a single index or may be a multipart index, and may be of any appropriate architecture and may be generated according to any appropriate method. For example, the index may be a bitmap index, dense index, sparse index, or a reverse index. Embodiments where multiple indices are used may implement different types of indices according to the properties of, e.g., the archives 404 to be stored in the volume 402. For example, the volume 402 may utilize a dense index for archives over a specified size (as the size of the index itself may be small relative to the number of archives stored on a given volume), and may also generate a sparse index for archives under that specified size (as the ratio of index size to archive size increases).

In embodiments where sparse indices are used, a sparse index 408 for a given volume may point to subindexes 410, which in turn mark representative locations on the volume. The subindexes 410 may be an abstraction that points to data that resides at a predetermined interval. In some embodiments, the subindexes 410 may be additional data or metadata that is stored in connection with (or in some embodiments, directly upon) the volume, and at a predetermined interval. In such embodiments, it may be contemplated that the subindexes 410 may be stored as part of the shard on the volume, in a similar fashion as described in connection with FIGS. 1 and 2 above for the index and the original data of the archives.

In some embodiments, the predetermined interval may be in blocks, bytes, or other units of data. For example, the subindexes may identify the archives to be located at every x blocks or bytes of the volume (e.g., independently of the boundaries and/or quantity of the archives themselves). In some embodiments, the predetermined interval may be delinated by number of volumes. For example, the subindex may point to every nth archive to be stored on the volume 402. As may contemplated, the sparse index 408 (and in some embodiments, the subindexes 410) may be generated and/or written at a time before the storage of the archives 404, contemporaneously with such storage, or after such storage. In some embodiments, the sparse index 408 and the subindexes 410 may be stored in a reserved space on the volume, e.g., after the archives 404 have been stored.

In some embodiments, the sparse index 408 is used in connection with information relating to the predetermined sort order of the archives 404 so as to locate specific archives. As previously mentioned, such sort order-related information may reside on the volume(s) 402 or, in some embodiments, on an entity separate from the volume(s) 402, such as in a data store or other resource of a computing resource service provider. An entity requesting a given archive stored on the volume 402 may determine, based on the sort order-related information and by reading the index 408, the nearest subindex that is sequentially prior to the requested archive on the volume 402. The requesting entity may then cause the volume 402 to be sequentially read from the location of that subindex 410 until the requested archive is located and fully read.

In embodiments where multiple types of indices are employed, the requesting entity may initially determine which of the indices includes the most efficient location information for the requested archive based on assessing the criteria used to deploy the multiple types of indices in the first instance. For example, if archives under a specific size are indexed in a sparse index and archives equal to or over that size are indexed in a parallel dense index, the requesting entity may first determine the size of the requested archive, and if the requested archive is larger than or equal to the aforementioned size boundary, may use the dense index in favor of the sparse index as to more quickly obtain the precise location of the requested archive.

Figure 5:
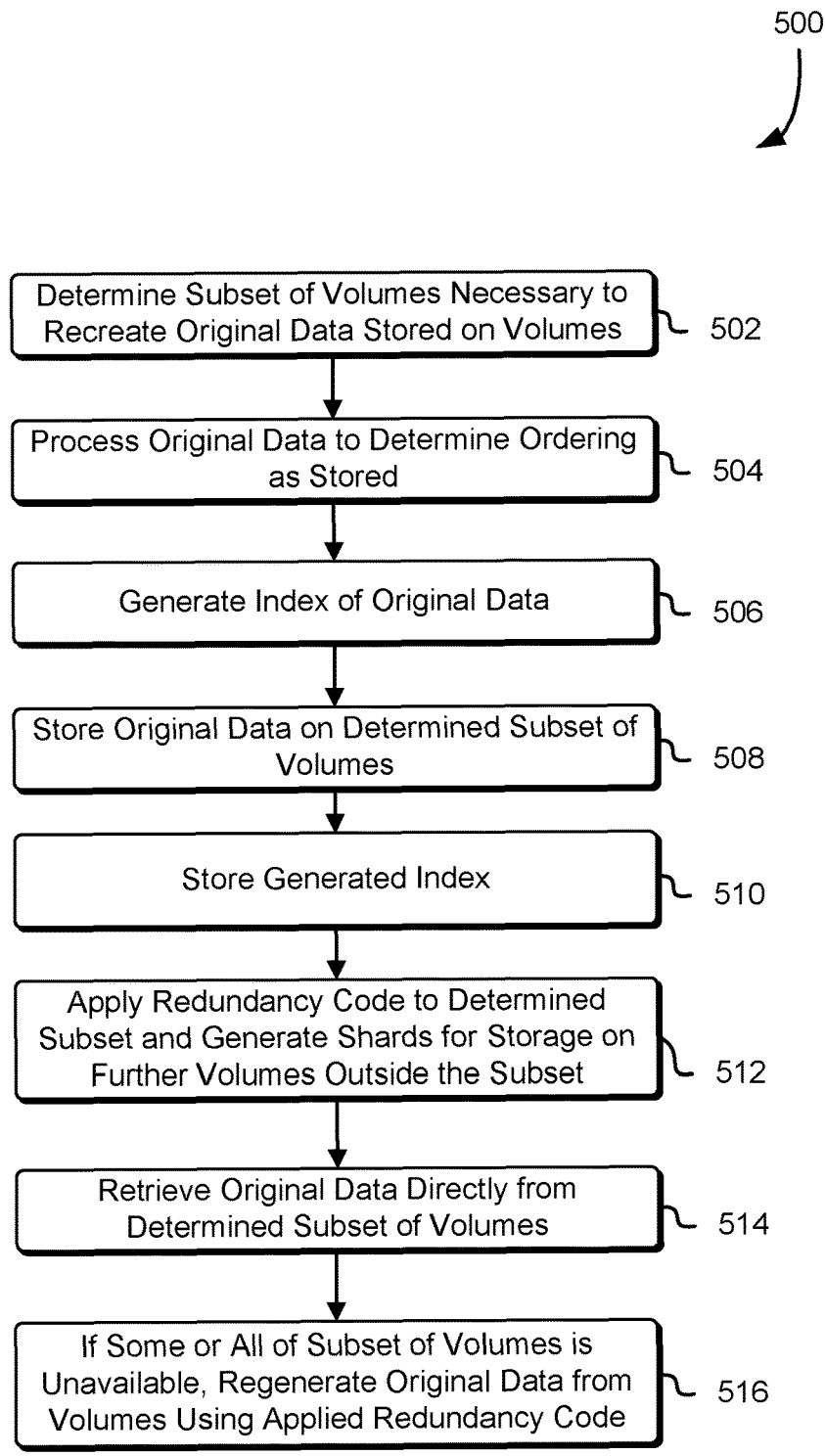
FIG. 5 schematically illustrates an example process for processing, indexing, storing, and retrieving data stored on a data storage system, in accordance with some embodiments.

FIG. 5 schematically illustrates an example process 500 for processing, indexing, storing, and retrieving data stored on a data storage system, in accordance with some embodiments. At step 502, a resource of a data storage system, such as that implementing a redundancy code to store archives, determines which subset (e.g., quantity) of a plurality of volumes is necessary, based on, e.g., a redundancy code to be applied to the archives, to recreate the original data to be stored. For example, in accordance with the techniques described above in connection with at least FIGS. 1 and 2, such information may be derived from predetermining the parameters of an erasure code with a specified ratio of shards necessary to regenerate the original data from which they derive to the total number of shards generated from the application of the erasure code.

At step 504, original data, such as original data of archives received from customers of, e.g., a data storage system or a computing resource service provider as described in further detail above in connection with FIGS. 1 and 2, is sorted by, e.g., the data storage system or associated entity. For example, as previously described, the sort order may be implemented on one or more attributes of the incoming data.

At step 506, one or more indices, such as sparse indices, are generated by, e.g., the data storage system, for the original data. As previously discussed in connection with at least FIGS. 1-4, there may be more than one index for a given volume, and such parallel indices may be of different types depending on the nature of the archives and/or original data being stored.

At step 508, the original data is stored, e.g., by the data storage system, on the subset of volumes determined in connection with step 502, and in the order determined in step 504. Additionally, at step 510, the index generated in step 506 is stored, e.g., by the data storage system, on an appropriate entity. As previously discussed, the index may be stored as part of a shard on which the original data is stored, or, in some embodiments, may be stored on a separate resource from that which persists the volume.

At step 512, the redundancy code is applied, e.g., by the data storage system, to the determined subset of volumes (e.g., shards, as previously discussed in connection with FIGS. 1-3), and additional shards containing data derived from the application of the redundancy code are stored on a predetermined quantity of volumes outside the subset determined in connection with step 502. For example, as previously discussed, the ratio of volumes (e.g., shards) storing the original data to the overall quantity of volumes (including those storing the derived data generated in this step 512) may be prescribed by the recovery/encoding ratio of the redundancy code applied herein.

At step 514, in normal operation, requested data may be retrieved, e.g., by the data storage system, directly from the subset of volumes storing the original data, without necessitating retrieval and further processing (e.g., by the redundancy code) from the volumes storing the derived data generated in step 512. However, at step 516, if any of the volumes are determined, e.g., by the data storage system, to be unavailable, a replacement shard may be generated by the data storage system by reconstructing the original data from a quorum of the remaining shards, and re-encoding using the redundancy code to generate the replacement shard. As previously discussed in connection with FIGS. 1-4, the replacement shard may be the same or different from the shard detected as unavailable.

Figure 6:
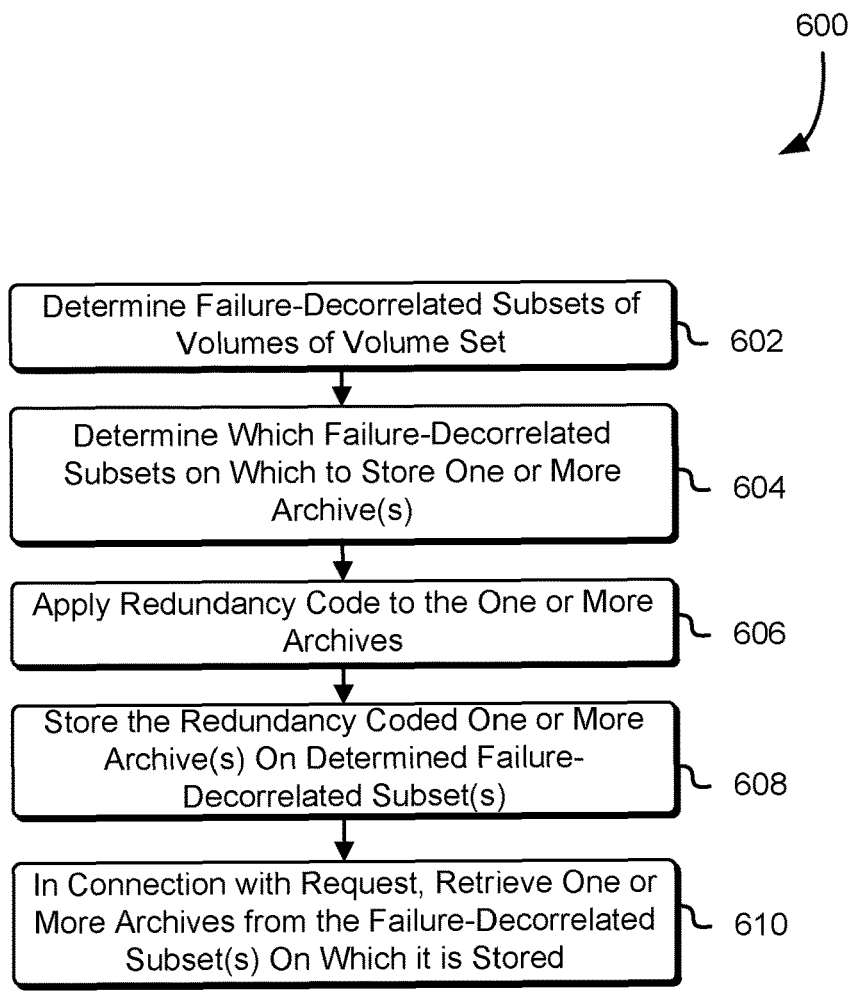
FIG. 6 schematically illustrates an example process for determining failure-decorrelated volume subsets and storing/retrieving data thereto, in accordance with some embodiments.

FIG. 6 schematically illustrates an example process 600 for determining failure-decorrelated volume subsets and storing/retrieving data thereto, in accordance with some embodiments. At step 602, the quantity, configuration, and/or size of failure-decorrelated subsets of a volume set are determined by, e.g., an implementing data storage system or computing resource service provider as described below. As mentioned in connection with at least FIG. 3, such quantity, configuration, and/or size of failure-decorrelated subsets may be tuned and/or adjusted according to the system characteristics desired. Also as mentioned, the number of cohorts from which a given failure-decorrelated subset is selected may also be adjusted or adjustable as necessary.

At step 604, the system determines which failure-decorrelated subset(s) to store archives incoming to the system. As previously mentioned, the determination may be made on any appropriate basis, such as using the attributes of the incoming archives, attributes of the volumes and/or the failure-decorrelated subset(s), and the like.

At step 606, a redundancy code, such as a forward error correction code or erasure code, may be applied to the archives by the system. As previously discussed, such application may be made prior to, after, or in connection with the storage of original data of the archives to be stored (and in some embodiments, may result generation of shards of derived data as well as shards of original data.

At step 608, some or all of the results of the encoding of step 606 are stored by the system on an appropriate failure-decorrelated subset for the given archive as determined in steps 602 and 604. As mentioned, in some embodiments, such storage may be performed using volume-encoding techniques, and thus the original data may be directly stored and/or retrieved from some or all of the volumes without necessitating decoding unless such volumes become unavailable.

At step 610, in connection with, e.g., a request from an owner or customer of the stored archives, the system locates the appropriate failure-decorrelated subset and retrieves the archives. The manner in which the system locates the appropriate failure-decorrelated subset may differ depending on how such failure-decorrelated subsets (and archives) are apportioned. For example, if the sequence of failure-decorrelated subsets is predetermined and keyed to a given attribute of the archive, the archive attribute may be used to identify which of the failure-decorrelated subsets is storing the data.

Figure 7:
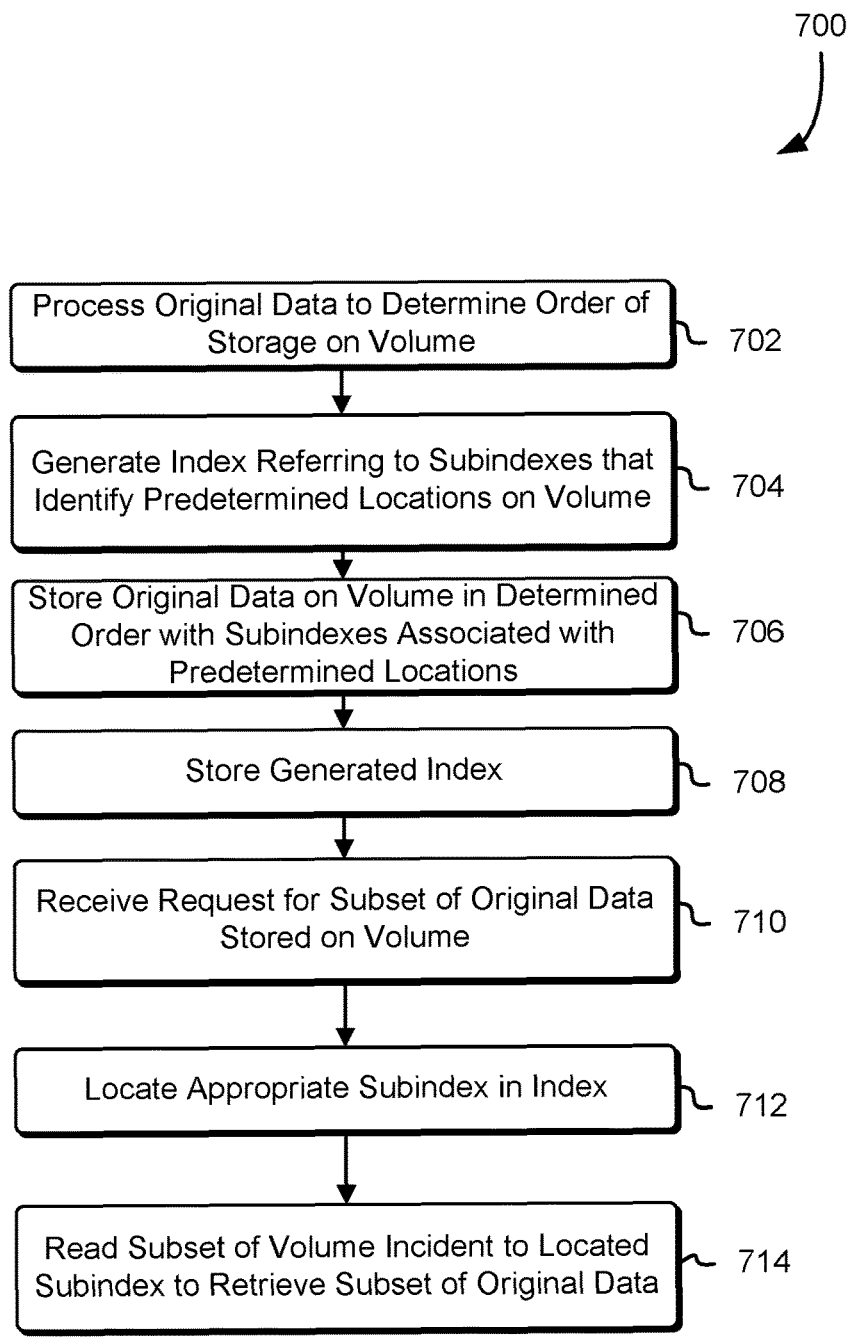
FIG. 7 schematically illustrates an example process for indexing original data stored on a redundancy coded data storage system, in accordance with some embodiments.

FIG. 7 schematically illustrates an example process 700 for indexing original data stored on a redundancy coded data storage system, in accordance with some embodiments. At step 702, similarly to step 404 of process 400 described in connection with FIG. 4, original data is processed by, e.g., a data storage system, to determine the order of storage of archives containing the original data on a volume. Information regarding the sort order may be persisted on, e.g., the volume, or a separate entity from the volume, as discussed above in connection with FIGS. 1-4.

At step 704, one or more indices, such as sparse indices, are generated by, e.g., the data storage system, and point to subindexes that identify predetermined locations on the volume. The locations may be predetermined based on the parameters of the specific implementation, such as the size of the volume, the speed of reading and/or writing the volume (e.g., sequentially), the number of archives per volume, and the like. As previously discussed, the subindexes may be abstractions, or, in some embodiments, may be data or metadata elements stored on or in connection with the volume.

At step 706, the original data sorted in step 702 is stored by the data storage system on the volume, with subindexes associated with, pointing to, or stored at predetermined locations mentioned in step 704. The index generated in step 704 is stored, at step 708, by the data storage system on a resource associated with volume, or, in some embodiments, on the volume itself, according to the techniques described above in connection with at least FIGS. 1-4.

At step 710, a request, such as from a client entity or other entity connected to the data storage system and/or the volume, for a subset of the original data stored on the volume, is received by the volume or the data storage system associated with the volume. The data storage system and/or the requesting entity may, as previously discussed, have access to information regarding the sort order of the original data as determined in step 702, and, in embodiments utilizing sparse indexes, may use the index to locate an appropriate subindex at step 712. As previously discussed, in some embodiments, the appropriate subindex is the nearest location, marked by the subindex, that is sequentially prior to the requested subset of original data as stored on the volume. Once the subindex is determined in step 712, at step 714, the volume is sequentially read (e.g., by the data storage system or the storage device on which the volume is implemented) from the location denoted by the appropriate subindex, until the requested subset of original data is located and retrieved.

Figure 8:
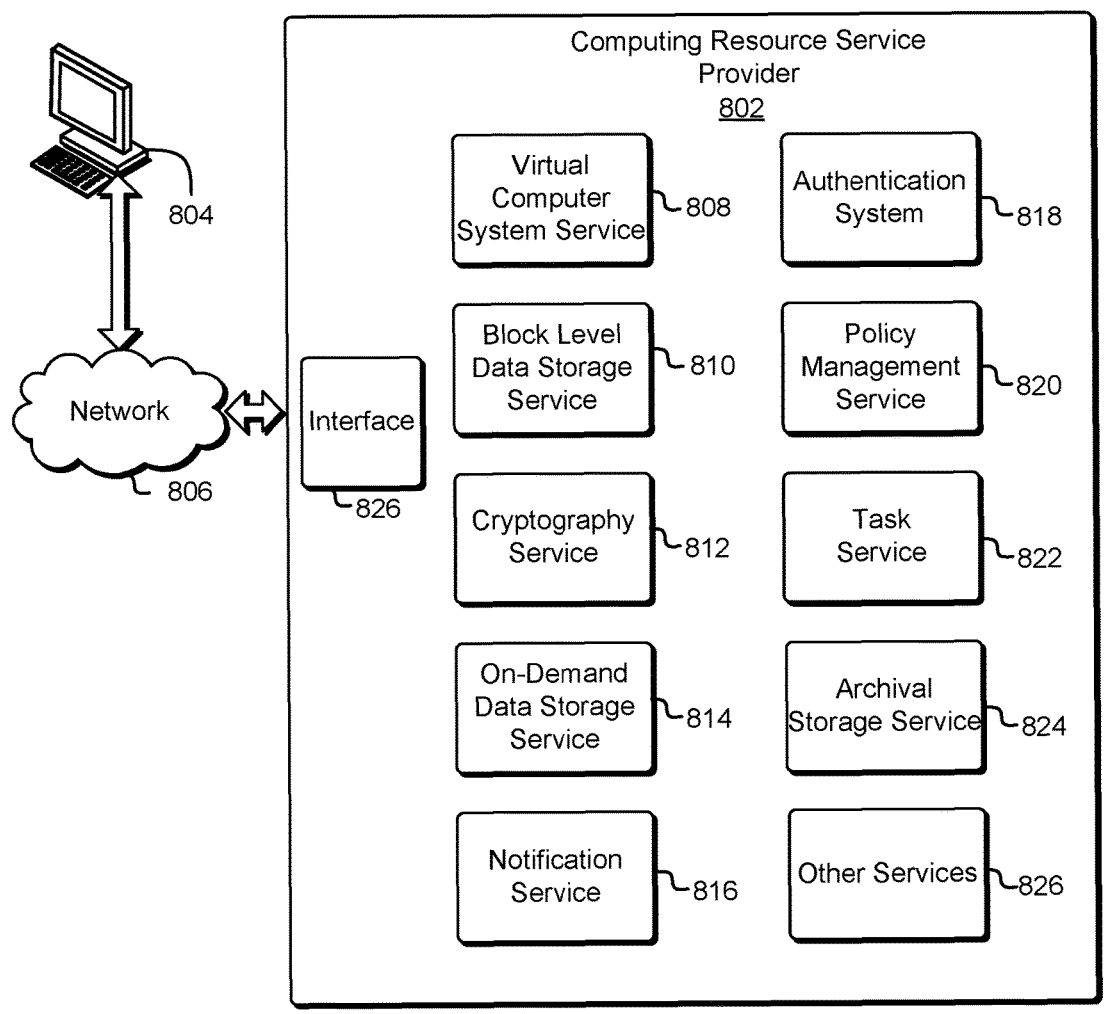
FIG. 8 schematically illustrates an environment, including a computing resource service provider, in which data storage and indexing techniques may be implemented, in accordance with some embodiments.

FIG. 8 shows an example of a customer connected to a computing resource service provider in accordance with at least one embodiment. The computing resource service provider 802 may provide a variety of services to the customer 804 and the customer 804 may communicate with the computing resource service provider 802 via an interface 826, which may be a web services interface or any other type of customer interface. While FIG. 8 shows one interface 826 for the services of the computing resource service provider 802, each service may have its own interface and, generally, subsets of the services may have corresponding interfaces in addition to or as an alternative to the interface 826. The customer 804 may be an organization that may utilize one or more of the services provided by the computing resource service provider 802 to maintain and deliver information to its employees, which may be located in various geographical locations. Additionally, the customer 804 may be an individual that utilizes the services of the computing resource service provider 802 to deliver content to a working group located remotely. As shown in FIG. 8, the customer 804 may communicate with the computing resource service provider 802 through a network 806, whereby the network 806 may be a communication network, such as the Internet, an intranet or an Internet service provider (ISP) network. Some communications from the customer 804 to the computing resource service provider 802 may cause the computing resource service provider 802 to operate in accordance with one or more embodiments described or a variation thereof.

The computing resource service provider 802 may provide various computing resource services to its customers. The services provided by the computing resource service provider 802, in this example, include a virtual computer system service 808, a block-level data storage service 810, a cryptography service 812, an on-demand data storage service 814, a notification service 816, an authentication system 818, a policy management service 820, a task service 822 and one or more other services 824. It is noted that not all embodiments described include the services 808-824 described with reference to FIG. 8 and additional services may be provided in addition to or as an alternative to services explicitly described. As described, each of the services 808-824 may include one or more web service interfaces that enable the customer 804 to submit appropriately configured API calls to the various services through web service requests. In addition, each of the services may include one or more service interfaces that enable the services to access each other (e.g., to enable a virtual computer system of the virtual computer system service 808 to store data in or retrieve data from the on-demand data storage service 814 and/or to access one or more block-level data storage devices provided by the block level data storage service 810).

The virtual computer system service 808 may be a collection of computing resources configured to instantiate virtual machine instances on behalf of the customer 804. The customer 804 may interact with the virtual computer system service 808 (via appropriately configured and authenticated API calls) to provision and operate virtual computer systems that are instantiated on physical computing devices hosted and operated by the computing resource service provider 802. The virtual computer systems may be used for various purposes, such as to operate as servers supporting a website, to operate business applications or, generally, to serve as computing power for the customer. Other applications for the virtual computer systems may be to support database applications, electronic commerce applications, business applications, and/or other applications. Although the virtual computer system service 808 is shown in FIG. 8, any other computer system or computer system service may be utilized in the computing resource service provider 802, such as a computer system or computer system service that does not employ virtualization or instantiation and instead provisions computing resources on dedicated or shared computers/servers and/or other physical devices.

The block-level data storage service 810 may comprise one or more computing resources that collectively operate to store data for a customer 804 using block-level storage devices (and/or virtualizations thereof). The block-level storage devices of the block-level data storage service 810 may, for instance, be operationally attached to virtual computer systems provided by the virtual computer system service 808 to serve as logical units (e.g., virtual drives) for the computer systems. A block-level storage device may enable the persistent storage of data used/generated by a corresponding virtual computer system where the virtual computer system service 808 may only provide ephemeral data storage.

The computing resource service provider 802 also includes a cryptography service 812. The cryptography service 812 may utilize one or more storage services of the computing resource service provider 802 to store keys of the customers in encrypted form, whereby the keys may be usable to decrypt customer 812 keys accessible only to particular devices of the cryptography service 812.

The computing resource service provider 802 further includes an on-demand data storage service 814. The on-demand data storage service 814 may be a collection of computing resources configured to synchronously process requests to store and/or access data. The on-demand data storage service 814 may operate using computing resources (e.g., databases) that enable the on-demand data storage service 814 to locate and retrieve data quickly, to allow data to be provided in responses to requests for the data. For example, the on-demand data storage service 814 may maintain stored data in a manner such that, when a request for a data object is retrieved, the data object can be provided (or streaming of the data object can be initiated) in a response to the request. As noted, data stored in the on-demand data storage service 814 may be organized into data objects. The data objects may have arbitrary sizes except, perhaps, for certain constraints on size. Thus, the on-demand data storage service 814 may store numerous data objects of varying sizes. The on-demand data storage service 814 may operate as a key value store that associates data objects with identifiers of the data objects that may be used by the customer 804 to retrieve or perform other operations in connection with the data objects stored by the on-demand data storage service 814.

In the environment illustrated in FIG. 8, a notification service 816 is included. The notification service 816 may comprise a collection of computing resources collectively configured to provide a web service or other interface and browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service 816 may provide notifications to clients using a "push" mechanism without the need to check periodically or "poll" for new information and updates. The notification service 816 may further be used for various purposes such as monitoring applications executing in the virtual computer system service 808, workflow systems, time-sensitive information updates, mobile applications, and many others.

As illustrated in FIG. 8, the computing resource service provider 802, in various embodiments, includes an authentication system 818 and a policy management service 820. The authentication system 818, in an embodiment, is a computer system (i.e., collection of computing resources)

configured to perform operations involved in authentication of users of the customer. For instance, one of the services 808-816 and 820-824 may provide information from a user to the authentication system 818 to receive information in return that indicates whether the user requests are authentic.

The policy management service 820, in an embodiment, is a computer system configured to manage policies on behalf of customers (such as customer 804) of the computing resource service provider 802. The policy management service 820 may include an interface that enables customers to submit requests related to the management of policy. Such requests may, for instance, be requests to add, delete, change, or otherwise modify policy for a customer or for other administrative actions, such as providing an inventory of existing policies and the like.

The computing resource service provider 802, in various embodiments, is also equipped with a task service 822. The task service 822 is configured to receive a task package from the customer 804 and enable executing tasks as dictated by the task package. The task service 822 may be configured to use any resource of the computing resource service provider 802, such as one or more instantiated virtual machines or virtual hosts, for executing the task. The task service 824 may configure the one or more instantiated virtual machines or virtual hosts to operate using a selected operating system and/or a selected execution application in accordance with a requirement of the customer 804.

The computing resource service provider 802 additionally maintains one or more other services 824 based at least in part on the needs of its customers 804. For instance, the computing resource service provider 802 may maintain a database service for its customers 804. A database service may be a collection of computing resources that collectively operate to run one or more databases for one or more customers 804. The customer 804 may operate and manage a database from the database service by utilizing appropriately configured API calls. This, in turn, may allow a customer 804 to maintain and potentially scale the operations in the database. Other services include, but are not limited to, object-level archival data storage services, services that manage and/or monitor other services.

The computing resource service provider 802 further includes an archival storage service 824. The archival storage service 824 may comprise a collection of computing resources that collectively operate to provide storage for data archiving and backup of customer data. The data may comprise one or more data files that may be combined to form an archive. The archival storage service 824 may be configured to persistently store data that may be infrequently accessed and for which long retrieval times are acceptable to a customer utilizing the archival storage service 824. A customer may interact with the archival storage service 824 (for example, through appropriately configured API calls made to the archival storage service 824) to generate one or more archives, upload and retrieve the one or more archives or monitor the generation, upload or retrieval of the one or more archives.

The computing resource service provider 802 additionally maintains one or more other services 826 based at least in part on the needs of its customers 804. For instance, the computing resource service provider 802 may maintain a database service for its customers 804. A database service may be a collection of computing resources that collectively operate to run one or more databases for one or more customers 804. The customer 804 may operate and manage a database from the database service by utilizing appropriately configured API calls. This, in turn, may allow a customer 804 to maintain and potentially scale the operations in the database. Other services include, but are not limited to, object-level archival data storage services, services that manage and/or monitor other services.

Figure 9:
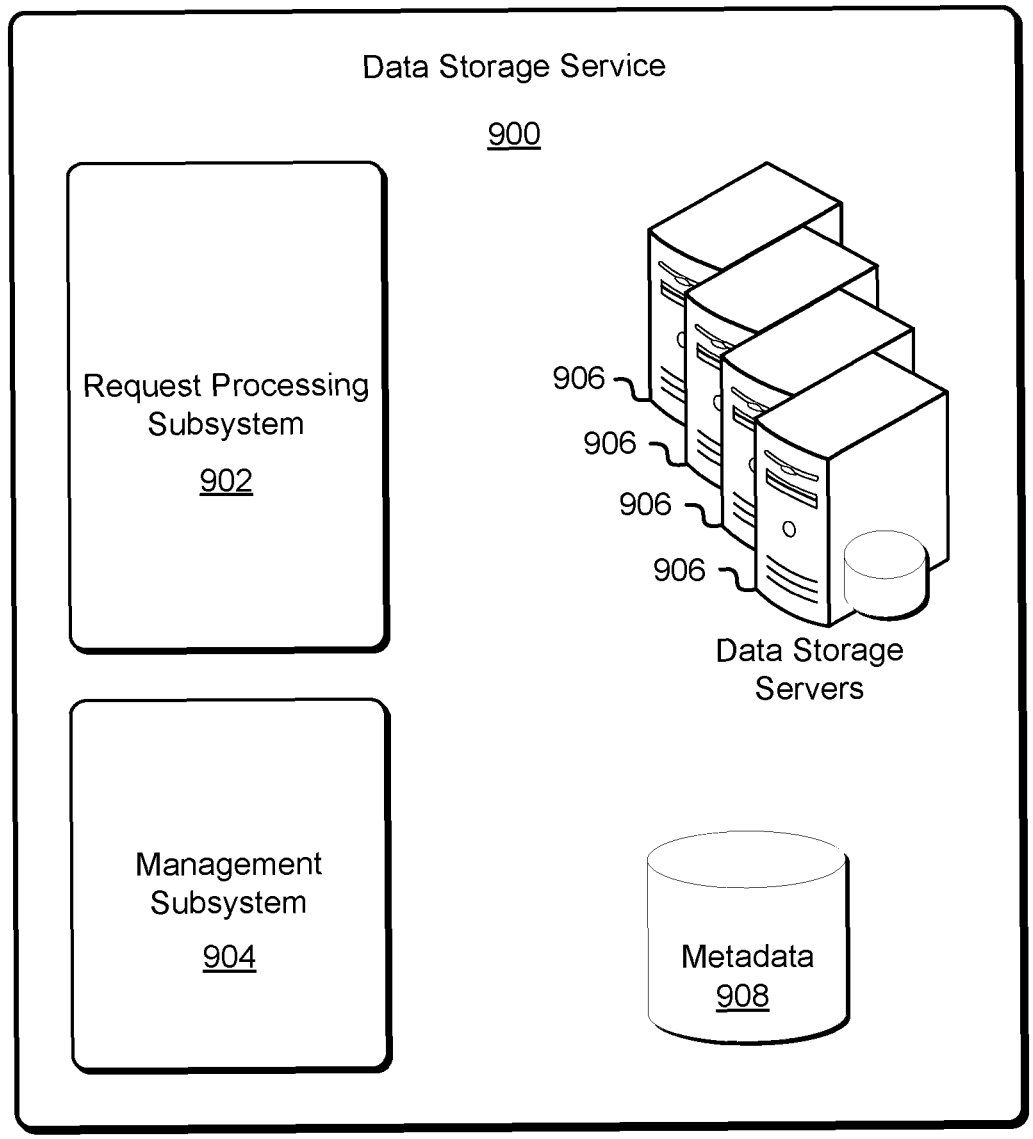
FIG. 9 schematically illustrates a data storage service capable of implementing various data storage and indexing techniques, in accordance with some embodiments.

FIG. 9 shows an illustrative example of a data storage service 900 in accordance with various embodiments. The data storage service 900 may be a service of a computing resource provider used to operate an on-demand data storage service, such as described above in connection with FIG. 8. As illustrated in FIG. 9, the data storage service 900 includes various subsystems such as a request processing subsystem 902 and a management subsystem 904. The data storage service 900 may also include a plurality of data storage servers 906 and a metadata storage 908, which may store metadata about various data objects stored among the data storage servers 906 as described. In an embodiment, the request processing subsystem 902 is a collection of computing resources, such as webservers and application servers, collectively configured to process requests submitted to the data storage service 900. The request processing subsystem 902, for example, may include one or more webservers that provide a web service interface to enable customers of the data storage service 900 to submit requests to be processed by the data storage service 900. The request processing subsystem 902 may include computers systems configured to make various determinations in connection with the processing of requests, such as whether policy allows fulfillment of a request, whether requests are authentic (e.g., electronically signed using a suitable cryptographic key) and otherwise.

Components of the request processing subsystem may interact with other components of the data storage service 900 (e.g., through network communications). For example, some requests submitted to the request processing subsystem 902 may involve the management of computing resources which may include data objects stored by the data storage servers 906. The request processing subsystem 902, for example, may receive and process requests to modify computing resources. For instance, in some examples, data objects are logically organized into logical data containers. Data objects associated with a logical data container may, for example, be said to be in the logical data container. Requests to the data processing subsystem 902 may include requests for creating logical data containers, deleting logical data containers, providing an inventory of a logical data container, providing or updating access control policy with respect to one or more logical data containers and the like.

The requests may be processed by the management subsystem 904 upon receipt by the request processing subsystem 902. If applicable, various requests processed by the request processing subsystem 902 and/or management subsystem 904, may result in the management subsystem 904 updating metadata associated with data objects and logical data containers stored in the metadata store 908. Other requests that may be processed by the request processing subsystem 902 include requests to perform operations in connection with data objects. The requests, for example, may include requests to upload data objects to the data storage service 900, to download data objects from the data storage service 900, to delete data objects stored by the data storage service 900 and/or other operations that may be performed.

Requests processed by the request processing subsystem 902 that involve operations on data objects (upload, download, delete, e.g.) may include interaction between the request processing subsystem 902 and one or more data storage servers 906. The data storage servers 906 may be computer system communicatively coupled with one or more storage devices for the persistent of data objects. For example, in order to process a request to upload a data object, the request processing subsystem may transmit data to a data storage server 906 for persistent storage. It is noted, however, that in some embodiments, client (e.g., customer) computer systems may transmit data directly to the data storage servers 906 instead of through severs in the request processing subsystem.

In some embodiments, the request processing subsystem 902 transmits data to multiple data storage servers 906 for the purposes of redundantly storing the data to allow the retrievability of data in the event of failure of an individual data storage server 906 and/or associated data storage device. For example, in some embodiments, the request processing subsystem uses a redundancy in coding scheme such as erasure coding to deconstruct a data object into multiple parts that are stored among the data storage servers 906. The parts may be configured such that if access to a certain number of parts is lost, the data object may nevertheless be reconstructible from the remaining parts that remain accessible.

To enable efficient transfer of data between the request processing subsystem 902 and the data storage servers 906 and/or generally to enable quick processing of requests, the request processing subsystem 902 may include one or more databases that enable the location of data among the data storage servers 906. For example, the request processing subsystem 902 may operate a key value store that serves to associate identifiers of data objects with locations among the data storage servers 906 for accessing data of the data objects.

Figure 10:
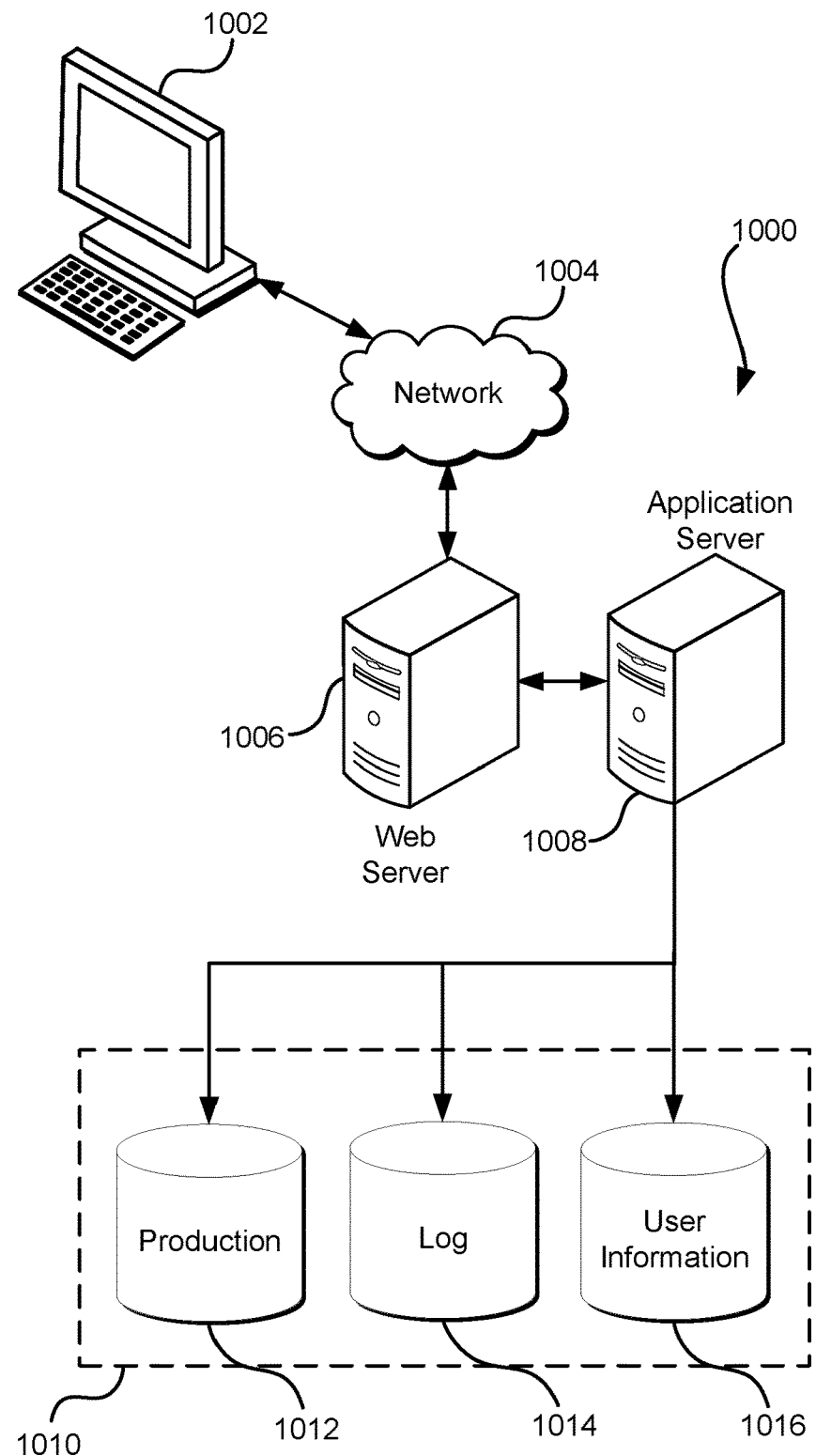
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually, and/or through other senses including touch, taste, and/or smell. The handling of all requests and responses, as well as the delivery of content between the client device 1002 and the application server 1008, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes, and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update, or otherwise process data in response thereto. The application server 1008 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM®, as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser.

It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory, or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
  receiving a request to store data on a plurality of volumes, the request including an identity associated with the requestor;
  determining, based at least in part on the identity, a set of storage patterns for the plurality of volumes, the set of storage patterns including:
    a first storage pattern comprising a first subset of the plurality of volumes, and a different second storage pattern comprising a second subset of the plurality of volumes having at least one failure characteristic differing from that of the first subset of the plurality of volumes;

selecting, based at least in part on an attribute associated with the data, a selected storage pattern from between at least the first storage pattern and the second storage pattern; and storing the data by at least:
redundancy coding the data to generate redundancy coded data; and
storing the redundancy coded data in accordance with the selected storage pattern.

2. The computer-implemented method of claim 1, further comprising:
retrieving the redundancy coded data stored in accordance with the selected storage pattern; and
regenerating the data from the redundancy coded data.

3. The computer-implemented method of claim 1, wherein the identity is an identity of the requestor.

4. The computer-implemented method of claim 1, wherein the redundancy code is an erasure code that includes an identity matrix.

5. A system, comprising:
at least one computing device that implements one or more services, wherein the one or more services:
receive a request to store an archive, the request including information associated with a storage characteristic for the archive;
determine, based at least in part on the information, a storage pattern for a set of volumes that is associated with a failure characteristic that differs from that of a different storage pattern for the set of volumes, the failure characteristic corresponding to the storage characteristic;
apply a redundancy code to the archive to generate a redundancy coded archive; and
store the redundancy coded archive on a subset of the set of volumes according to the storage pattern.

6. The system of claim 5, wherein the redundancy coded archive comprises a plurality of shards, at least one shard of which includes an original form of the archive.

7. The system of claim 5, wherein the one or more services further stores each shard of the plurality of shards on a respective volume of the set of volumes in accordance with the storage pattern.

8. The system of claim 5, wherein the one or more services receives the request via an archival storage service implemented by the system.

9. The system of claim 5, wherein each volume of the set of volumes corresponds to one storage device of a plurality of storage devices associated with the one or more services.

10. The system of claim 5, wherein the information includes an identity corresponding to a requestor associated with the request.

11. The system of claim 5, wherein the storage characteristic is defined in the request.

12. The system of claim 5, wherein the one or more services further stores additional archives associated with a different request, in accordance with the storage pattern, up to a quantity of data determined for the storage pattern.

13. A non-transitory computer-readable storage medium having stored thereon executable instructions that, upon execution by one or more processors of a computer system, cause the computer system to at least:
determine, based at least in part on a characteristic of data to be stored on a set of volumes, a set of storage patterns for the set of volumes, the set of storage patterns including at least one storage pattern that is associated with a failure characteristic that differs from that of a different storage pattern of the set of storage patterns;
select, based at least in part on an identity associated with a request to store the data, a selected storage pattern from the set of storage patterns;
apply a redundancy code to the data to generate one or more shards; and
store the one or more shards on a subset of the set of volumes according to the selected storage pattern.

14. The non-transitory computer-readable storage medium of claim 13, wherein the instructions that determine the set of storage patterns, upon execution by the one or more processors, further cause the computer system to map the characteristic to the failure characteristic.

15. The non-transitory computer-readable storage medium of claim 13, wherein the identity is associated with a customer entity associated with the request.

16. The non-transitory computer-readable storage medium of claim 13, wherein the instructions that determine the set of storage patterns, upon execution by the one or more processors, further cause the computer system to generate a set of pseudorandom storage patterns from which the set of storage patterns is determined.

17. The non-transitory computer-readable storage medium of claim 13, wherein the instructions, upon execution by the one or more processors, further cause the computer system to store the one or more shards such that each shard of the one or more shards is written to a different volume of the set of volumes.

18. The non-transitory computer-readable storage medium of claim 13, wherein the failure characteristic is correlated failure of a respective subset of the set of volumes.

19. The non-transitory computer-readable storage medium of claim 13, wherein the instructions, when executed by the one or more processors, further cause the computer system to store the one or more shards such that an identity shard of the one or more shards, the identity shard including the data in original form, is written to a single volume of the set of volumes.

20. The non-transitory computer-readable storage medium of claim 13, wherein the characteristic of the data is a desired durability for the data upon storage.

* * * * *